United States Patent
Brandt et al.

(10) Patent No.: US 8,525,534 B2
(45) Date of Patent: Sep. 3, 2013

(54) SALINITY INDEPENDENT MULTIPHASE MEASUREMENTS

(75) Inventors: Morten Brandt, Bønes (NO); Odd Petter Kalsaas, Søreidgrend (NO)

(73) Assignee: Roxar Flow Measurement AS, Bergen (NO)

( * ) Notice: Subject to any disclaimer, the term of this patent is extended or adjusted under 35 U.S.C. 154(b) by 641 days.

(21) Appl. No.: 12/601,069

(22) PCT Filed: Jun. 6, 2008

(86) PCT No.: PCT/NO2008/000204
§ 371 (c)(1),
(2), (4) Date: Nov. 20, 2009

(87) PCT Pub. No.: WO2008/150180
PCT Pub. Date: Dec. 11, 2008

(65) Prior Publication Data
US 2010/0164514 A1    Jul. 1, 2010

(30) Foreign Application Priority Data

Jun. 8, 2007 (NO) .................................. 20072926

(51) Int. Cl.
*G01R 27/08* (2006.01)
(52) U.S. Cl.
USPC ............................ 324/694; 324/691; 324/724
(58) Field of Classification Search
USPC ................. 324/300, 303, 691–724; 250/256, 250/269.3; 73/53.01
See application file for complete search history.

(56) References Cited

U.S. PATENT DOCUMENTS

| 5,747,749 | A | 5/1998 | Bednarczyk et al. |
| 6,335,959 | B1 * | 1/2002 | Lynch et al. .................... 378/45 |
| 2005/0016292 | A1 * | 1/2005 | Dutton et al. .............. 73/861.03 |

FOREIGN PATENT DOCUMENTS

| EP | 1 710 576 | 10/2006 |
| GB | 2 390 683 | 1/2004 |
| WO | WO 98/23931 | 6/1998 |
| WO | WO9823931 | * 6/1998 |
| WO | WO 2005/057142 | 6/2005 |

OTHER PUBLICATIONS

International Search Report for PCT/NO2008/000204, mailed Dec. 8, 2008.
Norwegian Search Report for Norway Application No. 20072926, dated Jan. 8, 2008.

* cited by examiner

*Primary Examiner* — Melissa Koval
*Assistant Examiner* — Farhana Hoque
(74) *Attorney, Agent, or Firm* — Nixon & Vanderhye P.C.

(57) ABSTRACT

Method and device for measuring the content of a fluid flow, the fluid containing a combination of at least two of gas, oil and/or water. The method comprising the steps of:—repeatedly measuring the electrical properties of a cross section of the fluid and detecting time sequences identified by low gas content, especially characterized in that a gas bubble is not present,—in said periods of low gas content measuring the density of the fluid in the flow, wherein the density measurements are performed in at least one period of low gas content and the a fluid density is calculated based on the measured densities over said period or periods.

16 Claims, 3 Drawing Sheets

SALINITY INDEPENDENT MULTIPHASE MEASUREMENTS

This application is the U.S. national phase of International Application No. PCT/NO2008/000204 filed 6 Jun. 2008, which designated the U.S. and claims priority to Norway Application No. 2007 2926 filed 8 Jun. 2007, the entire contents of each of which are hereby incorporated by reference.

The present invention relates to a method and system for measuring the ratio between oil, gas and water content of a fluid flow. More specifically the invention is aimed at monitoring the ratios in a multiphase fluid flow produced from oil or gas wells, especially for measuring the content or component fractions of a water continuous fluid flow also containing gas and/or oil.

The fluid in hydrocarbon boreholes generally flows through a conduit and the fluid normally comprises water, gas and oil in continuous and discontinuous phases. The gas and liquid are typically known to flow as bubble, churn, slug or annular flow generally depending on the gas flow rate relative to the liquid flow rate. The prior art discloses water cut meters which are devices for determining the water holdup in a producing well by measuring the capacitance or impedance of the fluid. The term is actually a misnomer because water cut is not the same as water holdup except in the unlikely case where all phases flow at the same velocity. Since hydrocarbons travel faster than water in a production well, the water holdup is larger than the water cut. However, a water cut meter has often been combined with a flow meter so that the water cut could be estimated by combining the two measurements. The proportion of the total flow rate due to a fluid component is known as its cut. To determine in-situ flow rates, it is necessary to measure the holdup and velocity of each fluid component.

Total water in fluid flow from hydrocarbon boreholes generally comprises free water plus suspended water in an emulsion and dissolved water. Free water is completely separated from any emulsion and not dissolved. The amount of dissolved water is generally very low, e.g. in the range of 0.01%-0.1%, and is generally influenced by interfacial properties but only minimally effected by temperature and pressure. The water volume flow rate, relative to the total liquid (e.g. oil and water) flow rate, is known as water cut when standardized with respect to pressure and temperature. Water cut is generally expressed as a percentage.

Oil and water from oil wells typically flow in an emulsion which may be in two different forms. In one emulsion form, the oil is the continuous phase having water dispersed in the oil as droplets. The foregoing emulsion has insulating electrical properties wherein the dielectric constant of the oil continuous emulsion may be measured by a capacitance sensor. Another emulsion form comprises a water continuous phase having oil dispersed in the water as droplets. This emulsion form has electrically conductive properties wherein the conductivity of the water continuous emulsion may be measured by a conductance sensor. Therefore, the electrical properties of these two different types of emulsion forms are completely different even for instances when the water cut may be the same. The prior art typically measures electrical properties and densities of the phase and emulsion flows by methods known to those skilled in the art in order to determine corresponding flow rates, e.g. by using look-up tables.

The prior art also discloses methods and apparatus to determine component flow rates in a water continuous phase emulsion by using, for example, fluid conductivity measurements. Typically, the prior art discloses methods and apparatuses for measuring component flow rates in a fluid comprising oil continuous or water continuous emulsions which may switch from using capacitance sensors to conductance sensors at the instant a water continuous phase emulsion is detected by the flow meter apparatus.

For multiphase measurements one known method, which e.g. is described in Norwegian Patent publication 307393, is to measure the presence of gas bubbles in the flow and to measure the permittivity of the fluid in the flow between the bubbles. In addition to this the mean density of the flow may be measured using a gamma detection device.

The present invention also includes the use of the calculation methods described more in detail in International Patent Application No. WO2006/132546 (PCT/NO2006/000218), which is included here by way of reference. In the calculations according to the present invention the measured conductivity or resistivity of the flow is used in stead of the permittivity, which is used as example in WO2006/132546.

Measured conductivity or resistivity of the flow is used when the water/oil mixture is in a water continuous state, and the method described in the referenced WO2006/132546 will then work as long as the conductivity of the water component is known and remains stable. However, in some cases in production of oil, water from a different zone or from water injection, having a different salinity or conductivity, may enter the well. The measurement of oil/water/gas composition using the method disclosed in the referenced WO2006/132546 will then be offset. The change in water conductivity will be an indication of unwanted water breakthrough in the well.

A first objective of this invention is to provide an improved multiphase measuring instrument and method for finding the gas/oil/water ratio in a water continuous multiphase flow. A further objective is to improve the performance of this measurement in conditions where the salinity or conductivity of the water component is unknown or unstable. And finally it is an objective of the invention to enable online monitoring of the salinity or conductivity of the water component.

These objectives are obtained by a system and a method as described in the accompanying claims.

The invention will be described more in detail below with reference to the accompanying drawings, illustrating the invention by way of example.

FIG. 1$a,b$ illustrates the fluctuations in the electrical characteristic measured according to the invention. FIG. 1$b$ also includes gamma radiation measurements.

FIG. 4$a,b$ illustrates the density measuring system according to two embodiments of the invention.

Figure 1A:
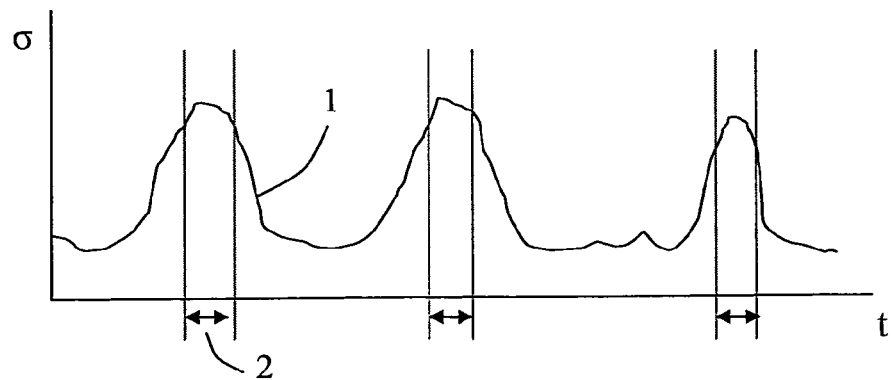
Figure 1B:
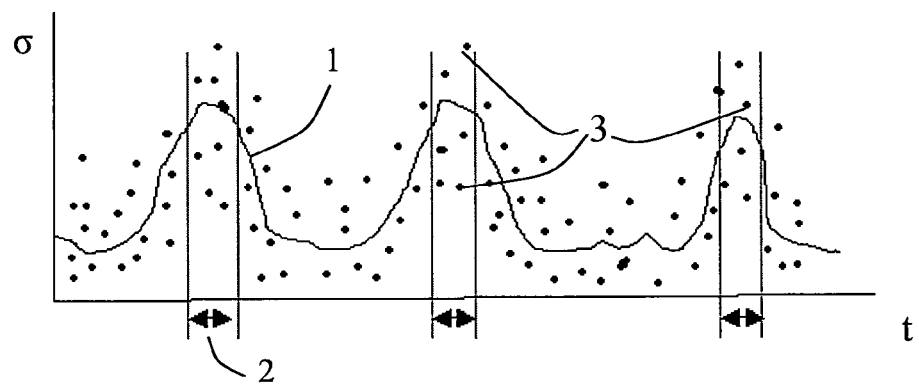
Figure 2:
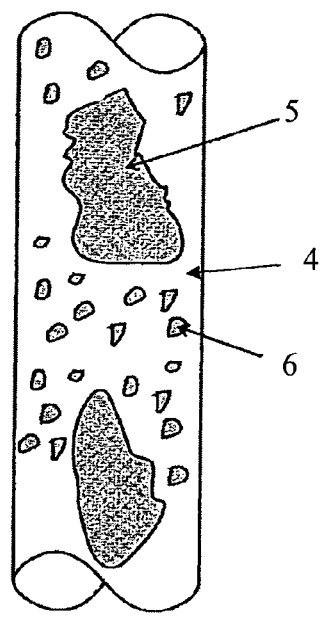
FIG. 2 illustrates a multiphase flow

FIGS. 1$a$ and 1$b$ illustrates the per se well known time development of a number of electrical characteristics in a flow containing gas bubbles 5,6 in addition to water and/or oil 4 (see FIG. 2). While other electrical characteristics like capacitance, resistivity, or permittivity may be measured depending on the types of content to be measured in the flow, the preferred embodiment of the invention is based on measurement of the conductivity 1 between at least two electrodes positioned at a chosen place in the pipe. By assuming that the highest conductivity is measured in the periods with least gas, ideally zero, the periods 2 between the bubbles are identified and thus the conductivity of the oil/water mixture, with little or no gas, is measured.

The conductivity of the fluid is thus measured with good accuracy, but the measurement cannot be used to calculate the oil/water ratio, as also the salinity, and therefore conductivity, of the process water is an unknown in the equation. We will therefore need one more measurement in order to calculate the oil/water ratio. As the densities of both oil and water can be considered known, the density measurements in the low gas content periods may provide the required equation relating to the ratio between the liquid components of the flow.

It is a fact that when salinity of the water changes, it is not only the conductivity that change, but also the density of the water will change. However, in relative terms, the density change will be very small compared to the change in conductivity. The error introduced by assuming the density to be known and constant will be very small.

The main problem related to the density measurements is, however, that the typical gamma measurements have low sampling rate and high statistical variation as is illustrated in FIG. 1b where the dots 3 represent the gamma samples. Due to the stochastic nature of the emissions from the gamma source, typically in order of 100 000 counts will be required in order to obtain sufficiently low statistical uncertainty in the density measurement. The method well known to the skilled measurement engineer for improving the accuracy of the gamma measurements, is to allow long sampling interval for each measurement. For the typical source strength used in industrial multiphase metering applications, several second sampling time is required in order to obtain this number of counts. The requirement in the present application is to measure density of gas-free liquid between bubbles, which will typically require sampling periods less than one tenth of a second. The alternative obvious to those skilled in the art is to increase the source strength of the gamma measurement system, leading to an increased number of counts per second. None of these well known methods can be used in the present invention for reasons to be explained in the following.

By using a long sampling interval, the resulting density measurement will be a time averaged density of the oil/water/gas mixture, and influenced also by the flow pattern. The measurement will not be representative for the oil/water mixture alone, thereby not enabling calculation of the oil/water ratio.

Increasing the strength of the source could in theory allow measurements with acceptable uncertainty within sufficiently short time intervals to identify the flow pattern, and thereby to select measurements representative for the density between gas bubbles. Such source would however have to be impracticable large, requiring bulky and heavy shielding to comply with relevant safety regulations. Transport of such large sources is also costly and cumbersome due to strict regulations.

According to the present invention, the density of the oil/water mixture between the gas bubbles can be measured using a gamma source of a size similar to, or even smaller than, what is typically used for industrial applications of multiphase meters. In the disclosed method, the gamma density meter should be mounted close to the plane of the conductivity measurement, enabling corresponding time series of density and conductivity to be matched.

To enable measurement of near gas free periods between bubbles, the sample rate of the gamma meter is increased, typically to between 100 and 1000 samples per second. Using standard size gamma source this will result in only say average of 10 counts per sample, as compared to the preferred 100 000 counts, and the uncertainty of each individual sample will therefore be very high.

While the scattering and high uncertainty gamma samples would not allow time sequences representing the flow between bubbles to be identified, the high accuracy fast response conductivity measurement can be used for this purpose. This data sampling, matching of data, and selecting only density samples recorded during periods 2 of little or no gas, can be repeated until a sufficient number of counts 3 for the density measurement have been achieved.

Assuming the densities of the water and oil components are a priory known, the average oil/water ratio can now be calculated using standard calculating techniques. Changes of the water conductivity will not influence this measurement, as it is only the time history of the conductivity measurement that is used in the algorithm, not the absolute value.

In the intended application, the conductivity of the water will not abruptly change from one time step to another, and will also typically not fluctuate between high an low values. If a water breakthrough occurs in the well, the conductivity of the water component will start changing from a previously stable level, and the change is expected to occur gradually over days and weeks.

The time span for the measurement of the conductivity and density as described above, will be very short compared to the expected rate of change of water conductivity in a real application. We will therefore obtain corresponding measurements of the conductivity and density of the oil/water emulsion of the flow, independent of the gas phase which is normally also present in the multiphase flow. Using otherwise known calculation techniques, it will now be possible to calculate the conductivity of the water component.

Therefore, using the disclosed invention, also the conductivity of the water can be continuously monitored, enabling early detection of a water breakthrough.

In order to improve the precision of the measurements, the density and conductivity of the individual fluids in the flow may be measured and the instrument according to the invention may be calibrated according to the known data. Especially, as even the flow 4 between the bubbles 5,6 may contain some gas, as is illustrated in FIG. 2, the density and conductivity measurements may be calibrated with a certain content of gas in the fluid.

To summarize with reference to FIGS. 1a and 1b the measurements are performed as follows.

1. Time series (preferably conductivity) from a conductance sensor is logged and the periods with maximum conductivity is flagged.
2. Density measurements are made at a high rate in the same time interval.
3. Density values from the periods with high conductivity is considered to be essentially free from gas, but may consist of an oil/water mixture.
4. The conductivity of the process water may be calculated from the highest conductivity values combined with the density measurements from the same periods.

It may be advantageous if the measurements of conductivity and density are performed in subsections of the flow, e.g. "point measurements", i.e. with as little influence from volumetric variations as possible.

Figure 3:
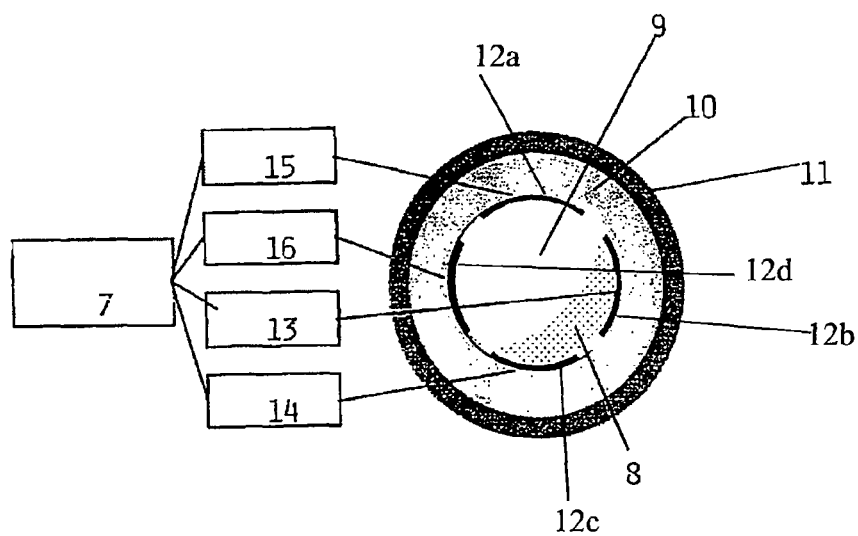
FIG. 3 illustrates the cross section of a measuring system for measuring the electrical properties of the fluid flow according to one embodiment of the invention.

FIG. 3 illustrates the cross section of a pipe containing the fluid 9 and being provided with four electrodes 12a-12d distributed over the inner circumference of the pipe and being coupled through coupling means 13,14,15,16 to measuring means 7 adapted to measure the conductivity of the flow between the electrodes. The drawing shows four electrodes 12a-12d but other numbers may also be chosen from two electrodes and up. In the illustrated example the conductivity may be measured across the pipe with two electrodes positioned on opposite sides 12a,12c, or between two adjacent electrodes 12a,12b thus measuring the conductivity of the fluid 8 in a subsection of the pipe cross section closer to the pipe wall. As the larger gas bubbles 5 usually move in the centre of the flow when the pipe is vertical the conductivity measurements close to the wall may provide a conductivity being more independent of the gas content. Even if the drawing shows four electrodes a more detailed view of the gas/liquid distribution over the pipe cross section may be found using a larger number of electrodes, e.g. six. If other electrical characteristics are to be measured other electrode configurations may be used.

The mathematical relationships used to calculate the flow content are per se known as soon as the electrical characteristics and density has been measured and will not be discussed in detail here.

Figure 4A:
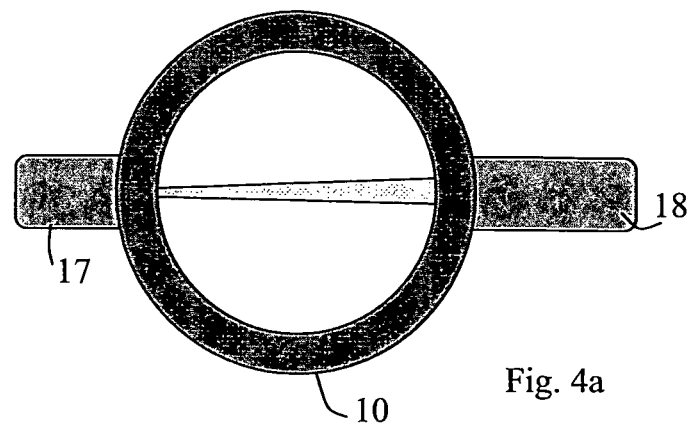
Figure 4B:
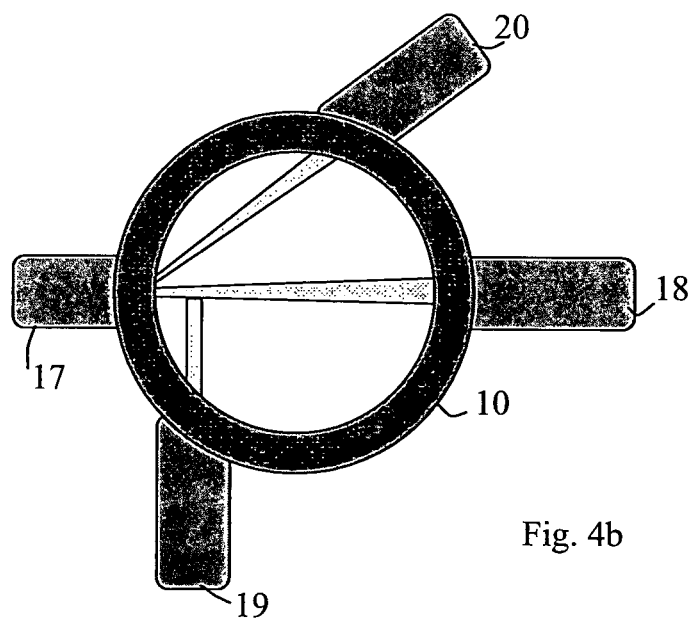

In FIGS. 4a and 4b a gamma source 17 and a detector 18 is illustrated being adapted to measure the density through the centre of the flow. The density will depend on the gas content and oil/water mixture of the flow. According to an alternative embodiment illustrated in FIG. 4b a second gamma detector 19 is positioned on the side of the gamma beam axis for measuring the scattering of the beam as discussed in Norwegian patent application No. 1999.2988 (Geir Anton Johansen) for the purpose of obtaining salinity independent density measurement in the flow. Gamma measurements may also be performed with beam aimed closer to the pipe wall so as to measure the density there as illustrated with the detector 20 in FIG. 4b. The precise nature of these detectors and the source may depend on the intended use and the available equipment, and is not considered important to this invention.

The invention claimed is:

1. A method for measuring the component fractions of a water continuous fluid flow also containing gas and/or oil, comprising the steps of:
   repeatedly measuring the electrical properties of a cross section of the fluid, and
   detecting time periods during which the fluid has low gas content based on the measured electrical properties of the fluid, wherein the detected time periods correspond to an absence of gas bubbles in the fluid,
   during said periods of low gas content, measuring the density of the fluid in the fluid flow proximate to the cross-section of the fluid where the electrical properties are measured, wherein the density measurements are performed in at least one of said periods of low gas content and a fluid density is calculated based on the measured densities over one or more of said periods, wherein the density is measured using gamma equipment and a high sampling rate receiver and wherein the density is calculated from sampled gamma readings received by the receiver during a chosen number of the time sequences identified by low gas content.

2. The method according to claim 1, wherein the electrical properties are measured using at least two electrodes coupled to a measuring instrument being adapted to measured the conductivity between the electrodes and, the conductivity indicates whether a gas bubble is present.

3. The method according to claim 2, wherein a salinity of the water in the flow is calculated from said calculated fluid density and the measured conductivity of the fluid flow.

4. The method according to claim 2, further comprising calculating an oil/gas/water content of the fluid flow for a period with detected gas bubbles in the flow, wherein the calculation is based on the measured conductivity of the flow during the period with the detected gas bubbles and the measured density of the flow during the period of low gas content.

5. The method according to claim 1, wherein the electrical properties are measured across a portion of a cross section of said fluid flow.

6. A multiphase measuring device for measuring the component fractions in a water continuous fluid flow, the fluid containing a combination of water and at least one of gas and oil and flowing through a pipe or similar, the device comprising:
   at least two electrodes coupled to a measuring instrument for measuring chosen electrical characteristics of the fluid at least partially between the electrodes, the measuring instrument being adapted to sample a time sequence of the measured electrical characteristics and to detect periods of a certain amount of gas in the flow,
   a gamma density measuring instrument that samples the density of the flow positioned proximate to the at least two electrodes and in at least one period of the time sequence, at a chosen sampling rate and to sample a time sequence of the detected signals, and
   a calculator that analyzes the gamma measurements sampled between the periods where the gas content was above a predetermined limit, so as to calculate the mean density of the fluid flow in said detected periods of a certain amount of gas in the flow.

7. The device according to claim 6, wherein the gamma density measuring instrument includes a high sampling rate receiver and the calculator is adapted to calculate the density from sampled gamma readings from a chosen number of periods in which the amount of gas in the flow is below said certain amount.

8. The device according to claim 6, wherein the electrical properties are measured using at least two electrodes coupled to a measuring instrument being adapted to measure the conductivity between them, the conductivity thus indicating the amount of water in the flow.

9. The device according to claim 8, wherein the calculator is adapted to calculate the salinity of the water in the flow from the density and the conductivity in the oil/water mixture.

10. The device according to claim 8, wherein the calculator is adapted to calculate the oil/gas/water content from the relative part of a predetermined time period with detected gas bubbles in the flow, the conductivity of the flow between the gas bubbles and the density of the flow between the gas bubbles.

11. The device according to claim 6, wherein the position of at least two of said electrodes are properties chosen so as to provide measurements from a subsection of a cross section of the fluid flow.

12. A method for analyzing a continuous fluid flow of a fluid including water and at least one of gas and oil, the method comprising:
   repeatedly measuring conductivity of a cross-section of the fluid flow;
   based on the conductivity measurement, identifying low gas periods during which the fluid flow is substantially free of gas bubbles;
   repeatedly sampling by a gamma detector of a gamma beam passing through the fluid flow proximate to the cross-section of the fluid flow being measured for conductivity, wherein for each sample the gamma detector outputs density sample data indicative of the density of the fluid;
   selecting a plurality of the density sample data which corresponds to the samples taken during the identified low gas periods, and
   determining the density of the fluid based on the selected plurality of the density sample data.

13. The method according to claim 12, wherein the conductivity is measured between electrodes in the fluid flow.

14. The method according to claim 12, further comprising measuring a salinity level of the fluid flow from the determined density.

15. The method according to claim 12 further comprising calculating a content of the oil or gas in the fluid flow during periods where the fluid flow includes gas bubbles, where the calculation of the content uses the measured conductivity of the flow during the periods where the fluid flow includes gas bubbles and the determined density of the fluid during identified low gas periods.

16. A measuring device to measure the gas or oil in a continuous fluid flow including water passing through a conduit, the device comprising:
- electrodes positioned in the conduit and in the continuous flow and coupled to a measuring instrument which measures the conductivity of the fluid flow and identifies periods of the fluid flow during which the fluid flow substantially gas free;
- a gamma source and gamma detector positioned in the conduit proximate to the at least two electrodes to pass a gamma beam from the source to the detector;
- a gamma density measuring instrument receiving an output signal from the gamma detector indicative of the gamma beam received at the detector, the gamma density measuring instrument measuring the density of the received gamma beam at different periods of the fluid flow, and
- a calculator that determines the fluid flow density based on the gamma density measurements corresponding to periods during which the fluid flow has a low gas content, wherein the calculator identifies the periods of the flow with low gas content based on the measured conductivity of the fluid flow.

* * * * *